W. L. CROWSON.
ROLLER COTTON GIN.
APPLICATION FILED JULY 18, 1907.
No. 904,939.
Patented Nov. 24, 1908.
4 SHEETS—SHEET 1.
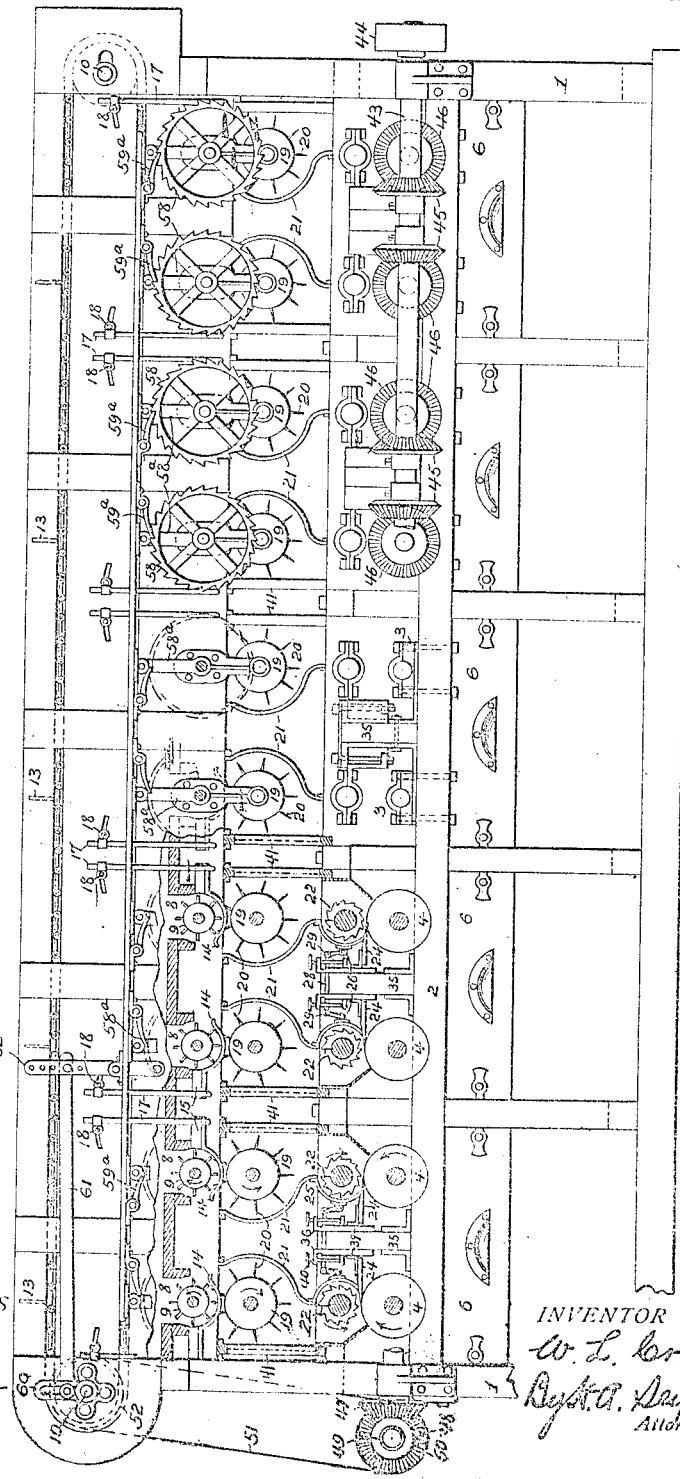
WITNESSES
INVENTOR
W. L. Crowson
Attorney

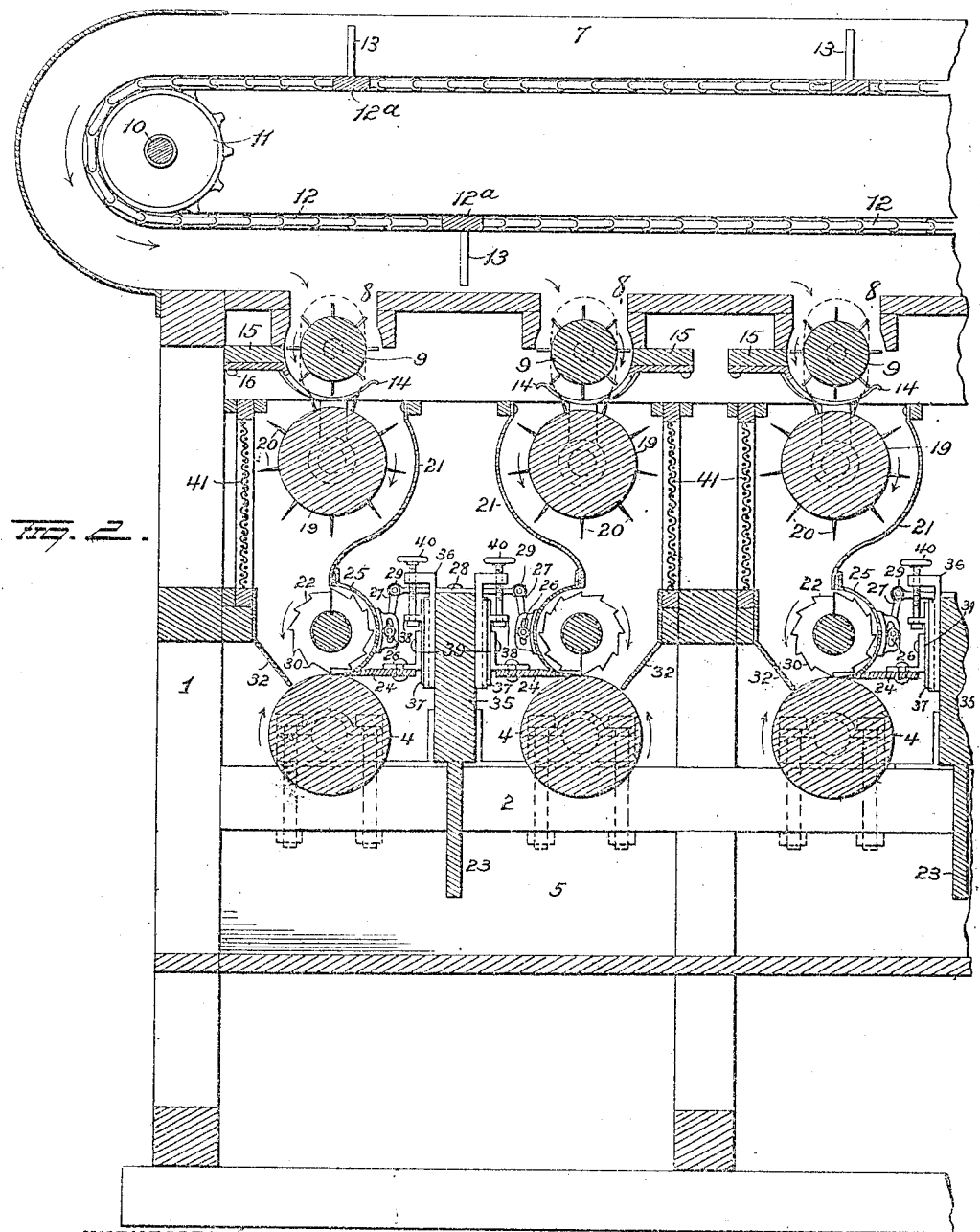

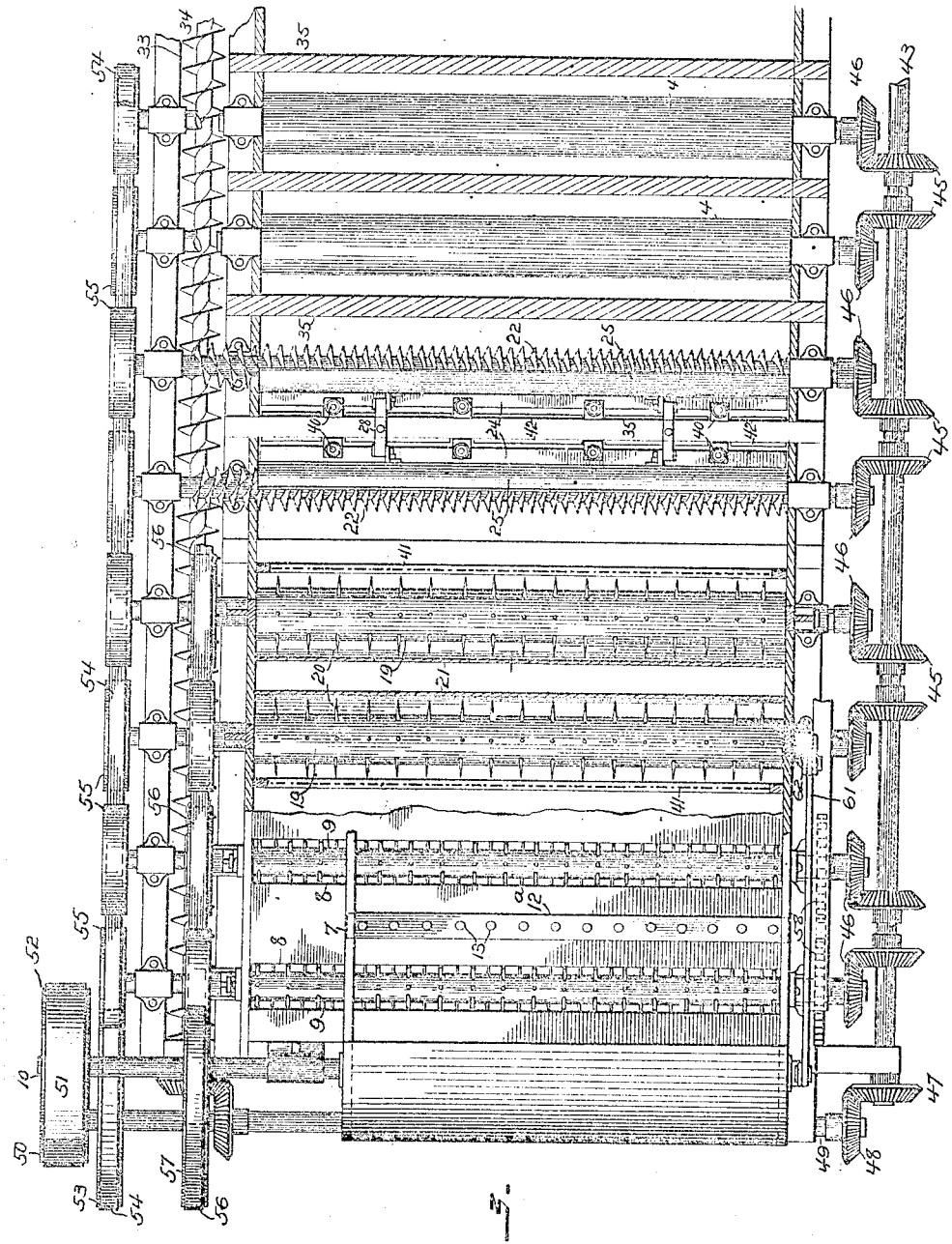

W. L. CROWSON.
ROLLER COTTON GIN.
APPLICATION FILED JULY 18, 1907.
No. 904,939.
Patented Nov. 24, 1908.
4 SHEETS—SHEET 4.
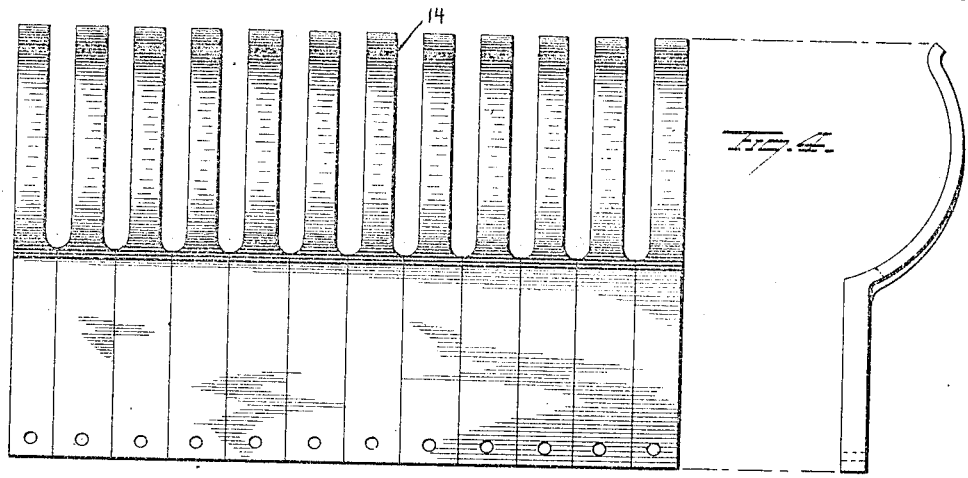
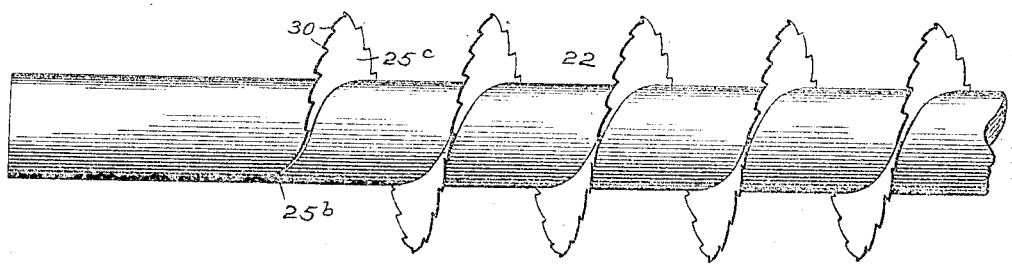
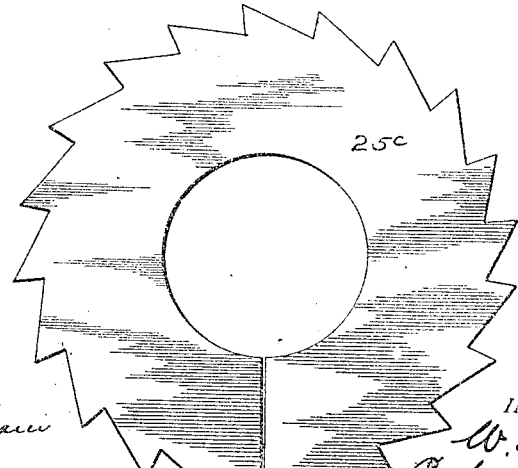
WITNESSES
INVENTOR
W. L. Crowson
Attorney

UNITED STATES PATENT OFFICE.

WILLIAM L. CROWSON, OF MEMPHIS, TENNESSEE, ASSIGNOR OF ONE-FOURTH TO JOHN M. BRAUN; ONE-FOURTH TO JOSEPH E. BRAUN, AND ONE-FOURTH TO ROMAN BRAUN, ALL OF MEMPHIS, TENNESSEE.

ROLLER COTTON-GIN.

No. 904,939.     Specification of Letters Patent.     Patented Nov. 24, 1908.

Application filed July 18, 1907. Serial No. 384,483.

*To all whom it may concern:*

Be it known that I, WILLIAM L. CROWSON, a resident of Memphis, in the county of Shelby and State of Tennessee, have invented certain new and useful Improvements in Roller Cotton-Gins; and I do hereby declare the following to be a full, clear, and exact description of the invention, such as will enable others skilled in the art to which it appertains to make and use the same.

My invention relates to cotton gins and more particularly to improvements in gins of the roller type, such as disclosed by Letters Patent No. 824,414 granted to me on the 12th day of June 1906.

One object of my present invention is to improve the machine disclosed by my said former patent whereby the efficient ginning of roughly gathered or "hully" cotton will be insured.

A further object is to so construct the machine that the cotton will be delivered to the various ginning rollers in equal proportions and in proper condition to be effectually ginned.

A further object is to construct the machine in such manner that the cotton shall be effectually picked or disintegrated and separated from the hulls, seed or other extraneous substances before being presented to the ginning rollers.

A further object is to provide means for separating the seed from the cotton, which means shall be so constructed as to avoid the discharge of cotton from the machine with the seed.

A further object is to construct the machine in such manner that all the cotton fed thereto shall be ginned, the seed being repeatedly presented to the knives where they bear upon the ginning rollers, as long as any cotton adheres to said seed.

A further object is to improve the machine in various other respects as hereinafter explained.

With these objects in view, the invention consists in certain novel features of construction and combinations of parts as hereinafter set forth and pointed out in the claims.

In the accompanying drawings, Figure 1 is a view partly in side elevation and partly in longitudinal section; Fig. 2, is an enlarged sectional view of a portion of the machine, Fig. 3 is a plan view, partly in horizontal section; Figs. 4, 5 and 6 are enlarged views of certain details of construction.

1 represents a suitable framework, provided on its longitudinal timbers 2, with boxes 3 in which the journals of leather covered ginning rollers 4 are mounted, and below the latter a flue 5 (normally closed by doors 6) is located to receive the ginned cotton. A draft of air is made to pass through this flue so as to cause the cotton to travel therethrough and in order that said draft shall be adequate, a series of baffle boards 23 extend partially across said flue. Any suitable means may be provided for creating suction through the flue 5 and the cotton may be caused to be discharged from said flue into a condenser (not shown) located at one end thereof, as usual.

On the top of the framework, a distributer box or casing 7 is located and provided in its bottom with a number of discharge openings or spouts 8, under each of which, a toothed roller 9 is mounted. At respective ends of the distributer box, shafts 10 are mounted and provided with sprocket wheels 11, over which sprocket chains 12 pass. These chains are connected at intervals by cross bars 12ª having fingers 13. said chains, with their fingered cross bars thus constituting a conveyer or distributer, to which cotton is fed by any suitable feeding means. The conveyer is located parallel with the bottom of the box 7 and its fingers 13 operate to distribute the cotton to the various openings or spouts 8 keeping the latter filled over the toothed rollers 9, and these rollers serve to feed the cotton downwardly.

Below each feed roller 9, a series of curved fingers 14, is located. These fingers are arranged to form elongated slots between them and are secured to a cross bar 15. This cross bar and the fingers secured thereto, are supported by a rod 16 disposed transversely and having mountings, in the framework, and one end of said rod is provided with an upwardly projecting arm 17 adjustably secured at 18, to the framework. By means of the arm 17, the fingers 14 can be adjusted relatively to the toothed feed roller above it, and also relatively to a picker or disintegrating roller 19 below it. Each picker roller 19 is provided with a series of comparatively long teeth or prongs 20, which pass through the slots between the curved fingers 14. The picker roller is rotated at a rapid rate of speed so that its prongs will engage the cotton which is fed downwardly by the toothed feed roller 9 pulling it apart and disintegrating it, so as to free the hulls and other extraneous substances from said cotton and then cause the cotton to descend. As the cotton is thus pulled apart and carried downwardly by the picker roller, it will be directed, by a curved guard plate 21 to a combined spiral beater and conveyer 22 located immediately over the ginning roller and over the edge of a doctor knife 24 which bears upon said roller.

A curved guard plate 25 extends from the lower edge of the guard plate 21 to the doctor knife, and has secured to it, a slotted block 26 adjustably secured to the lower end of an arm 27. The upper end of this arm is adjustably attached to a bar 28 and normally rigidly secured to said bar by means of a clamping nut 29. By these means, the guard plate 25 can be adjusted toward and away from the spiral beater 22 and also in a vertical direction relatively to the doctor knife.

The peripheral edge of the spiral beater is provided with teeth 30, and while this beater might be made in various ways, the construction shown in Figs. 5 and 6 is simple and efficient. In the construction here shown, the spiral beater comprises a shaft 25$^a$ having a spiral groove 25$^b$, and in this spiral groove, twisted disks 25$^c$ having toothed peripheral edges, are secured,—said disks abutting edge to edge and forming the spiral flights of the beater-conveyer.

As the cotton descends from the picker roller and over the spiral beater, it will be directed to the ginning roller by a guard plate 32, the cotton finding its way under the doctor knife bearing upon said roller, and finally into the flue, through which it is discharged as before explained. The seed and other extraneous substances, which cannot pass under the doctor knife, will be caught by the spiral beater-conveyer which will finally discharge the same into a trough 33, from which it will be carried by a conveyer 34.

When the seeds pass over the doctor knife, more or less cotton will be carried with them into the beater-conveyer, and if the latter were not provided with teeth, this cotton would finally find its way to the discharge trough 33. The teeth on the beater-conveyer will, however, engage such cotton and present it again to the doctor knife on the ginning roller. In fact, the seed will be continuously carried over and presented to the doctor knife as long as cotton adheres to said seed, and thus the seed will, to a great extent, be delinted; all the cotton entering the machine will be ginned, and the necessity for subjecting the seed to a subsequent delinting process will be obviated.

I have above described, the construction and operation of one unit of the machine, but the machine comprises many such units, and in the construction shown in the drawing I have illustrated said units arranged in pairs.

Between the units of each pair, a transverse timber 35 is located, and this timber serves to support the doctor knives and guards 25, for two units of one pair. Thus, the bar 28 is secured upon the transverse timber 35 and supports, at respective ends, guard plates 25 for the beater-conveyers of two units. The said transverse timber has secured to its respective faces, supporting and adjusting means for the doctor knives of two units of the machine. In constructing each of these supporting and adjusting means for the doctor knives, brackets 36 are secured to the timber 35, and receive vertically movable plates or slides 37, each having a lug 38. The doctor knives are secured to the slides 37 by means of angle irons 39, and to adjust said knives vertically so as to regulate the pressure thereof upon the ginning rollers, adjusting screws 40 passing through horizontal portions of the bracket 36 are swiveled at their lower ends to the lugs 38 on the slides 37.

In order to prevent the cotton from adhering to the ginning rollers and doctor knives after passing the latter, a draft of air is caused to pass downwardly behind each ginning roller and its coöperating doctor knife, the air for producing such draft, entering the upper portions of the framework through the various openings therein. The means whereby the air current is made to pass through the flue 5 is located beyond the discharge end of the latter, and if the resistance to the admission of air into this flue from the upper portion of the machine be the same from end to end of the machine, the air currents passing down into said flue would be largely confined to the discharge end of the machine; and if the admission of air into the portions of the machine above the ginning rollers be too free as compared to the amount of air admitted into the inlet end of the flue 5, the force of the air currents passing downwardly behind the ginning rollers would be diminished. In order to obviate these difficulties, the admission of air into the space above the ginning rollers will be restricted by means of screens 41, which latter will also serve to confine all fine particles within the machine. The downward passage of air above referred to will occur between the rear edges of the doctor knives and the transverse timber 35, but as previously stated, these spaces should be largest at the entrance end of the machine and gradually diminish in size toward the discharge end of the machine, so as to insure air currents of equal force behind all the ginning rollers. I therefore apply strips 42 (varying in thickness from the inlet to the discharge end of the machine) to the side faces of the timber 35. In this way, the passages for air behind the doctor knives can be regulated in size according to their distance from the end of the machine to which the air exhausting means are applicable.

A shaft 43 is mounted in suitable bearings secured to the framework and provided at one end with a pulley 44 to which power may be applied from any convenient source. To this shaft bevel gears 45 are secured and mesh with similar bevel gears 46 on the journals of the ginning rollers. A bevel gear 47 on one end of the shaft 43, transmits motion to a bevel gear 48 on a transverse shaft 49, and the latter is provided with a pulley 50. A strap 51 transmits motion from the pulley 50 to a pulley 52 on one of the shafts 10 of the distributer for driving the latter. The shaft 49 is also provided with a pulley 53 which receives a strap 54, for driving the beater-conveyer 22, said strap passing alternately over and under pulleys 55 secured to journals of said beater-conveyers, and driving the alternate beater-conveyers in reverse directions. Similarly, the alternate picker rollers 19 are driven in reverse directions, by a belt 56, which receives motion from a pulley 57 on the shaft 49.

The toothed feed rollers 9 are rotated, step by step, so that they will feed the cotton slowly and gradually forward. To accomplish this, each feed roller is provided at one end with a ratchet wheel 58, and over said ratchet wheels, a series of links 58ª support a reciprocating bar 59 and the latter is provided with dogs 59ª to engage the ratchet wheels. The bar 59 is reciprocated by means of a crank arm 60 secured to one of the shafts 10 and connected by a rod or pitman 61, with an arm 62 attached to said bar 59.

Various slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a roller cotton gin, the combination with a ginning roller and a feed roller above the same, of a series of fingers disposed directly beneath the feed roller, a picker roller under said fingers and having prongs to pass between the same, and means for directing cotton from said picker roller to the ginning roller.

2. In a roller cotton gin, the combination with a ginning roller and a toothed feed roller above the same, of a picker roller mounted below the feed roller and having peripheral prongs, a series of fingers curved substantially concentric to the feed roller and disposed under the toothed feed roller and over the picker roller in position to permit the passage of the prongs of the picker roller between them and means for directing cotton from said picker roller and fingers to the ginning roller.

3. In a roller cotton gin, the combination with a ginning roller, and a feed roller above the same, of a picker roller below the feed roller, a series of horizontally disposed fingers located beneath the feed roller and over the picker roller so as to receive the projections of the picker roller between them, and means for adjusting said horizontally disposed fingers relatively to the picker roller and feed roller.

4. In a roller cotton gin, the combination with a ginning roller, and a feed roller above the same, of a picker roller below the feed roller, a series of curved fingers under the feed roller and coöperating with the picker roller, a support for said fingers, an arm secured to said support for turning it to adjust the fingers relatively to the feed and picker rollers, and means for securing said arm in a fixed position.

5. In a roller cotton gin, the combination with a ginning roller, and a doctor knife bearing thereon, of a beater-conveyer having teeth, disposed over said ginning roller and doctor knife, and a curved guard partially embracing said toothed beater-conveyer and terminating at its lower end in close proximity to the doctor knife.

6. In a roller cotton gin, the combination with a ginning roller and a doctor knife, of a spiral beater disposed over the ginning roller and provided in the periphery of its flights with teeth, and a guard partially embracing said spiral beater over the doctor knife.

7. In a roller cotton gin, the combination with a ginning roller, and a doctor knife bearing thereon, of a spiral beater-conveyer mounted over said ginning roller, and provided in the periphery of its flights with teeth, and a curved guard plate disposed at one side of and partially embracing said spiral beater-conveyer and coöperating therewith and with the doctor knife.

8. In a roller cotton gin, the combination with a ginning roller, and a doctor knife bearing thereon, of a beater-conveyer over the ginning roller, a curved guard plate at one side of said beater-conveyer, a support for said plate, an arm adjustably secured to said support, and means for adjustably securing the curved guard to said adjustable arm.

9. In a roller cotton gin, the combination with a ginning roller and a doctor knife bearing thereon, of a spiral beater-conveyer having peripheral teeth and a laterally and vertically adjustable, curved guard plate at one side of said beater-conveyer and coöperating therewith.

10. In a roller cotton gin, the combination with ginning means, and a toothed feed roller, of a picker roller below the feed roller and having prongs, a series of horizontally disposed fingers between said rollers and between which the prongs of the picker roller pass, means for slowly rotating the feed roller step-by-step, and means for rapidly rotating the picker roller.

11. In a roller cotton gin, the combination with ginning means, and a toothed feed roller, of a spiral beater-conveyer having teeth, a series of fingers under the feed roller, a picker roller below said fingers and having peripheral prongs passing between the latter, a guard plate at one side of the picker roller and terminating over the spiral beater-conveyer, and a curved guard at one side of said beater-conveyer and terminating at its upper edge at the lower edge of the first-mentioned curved guard.

12. In a roller cotton gin, the combination of a series of toothed feed rollers, a spout over each feed roller, means for maintaining said spouts filled with cotton, a series of horizontally disposed fingers under each feed roller, a picker roller under each series of fingers and having prongs passing between said fingers, a ginning roller below each picker roller, a doctor knife bearing on each ginning roller, means for directing cotton from the picker roller and fingers to the ginning roller and doctor knives and means for segregating one series of rollers, beaters and doctor knives from the others.

13. A roller cotton gin comprising a series of units, each comprising in vertical series, a ginning roller, a doctor knife, a beater over the ginning roller, a picker roller, above the beater, a series of fingers over the picker roller and between which the prongs of the latter pass and a feed roller over said fingers, means for maintaining all of said units supplied with cotton to be ginned, and means inclosing the picker and beater rolls of the units.

14. In a roller cotton gin, the combination with a frame-work and a discharge flue to receive ginned cotton, of a series of units each comprising ginning and feeding means, means permitting a downward passage of air through each unit into said discharge flue to keep the rollers of the ginning means clean, and means for restricting the drafts progressively from the entrance to the exit end of the machine.

15. In a roller cotton gin, the combination with framework, and a discharge flue for ginned cotton, of a series of units, each comprising ginning and feeding means, means for segregating the several units, the compartment of each of said units communicating with the discharge flue, and means for restricting such communication progressing from the entrance to the exit end of the machine, whereby air currents are caused to pass downwardly past the ginning roller of each unit into the discharge flue to keep the ginning rollers clean.

16. In a roller cotton gin, the combination with framework and a discharge flue for ginned cotton, of a ginning roller over said flue, a doctor knife bearing on said roller, a beater over the ginning roller, feeding and picking means above said beater, guards at one side of said picking means and beater, and a screen and a guard at the other side of said picking means and beater.

In testimony whereof, I have signed this specification in the presence of two subscribing witnesses.

WILLIAM L. CROWSON.

Witnesses:
 R. S. FERGUSON,
 W. E. WRIGHT.